United States Patent
Sipos

(10) Patent No.: US 9,567,431 B2
(45) Date of Patent: Feb. 14, 2017

(54) PROCESS FOR PREPARING A POLYMER HAVING A 2,5-FURANDICARBOXYLATE MOIETY WITHIN THE POLYMER BACKBONE AND SUCH (CO)POLYMERS

(75) Inventor: Laszlo Sipos, Amsterdam (NL)

(73) Assignee: FURANIX TECHNOLOGIES B.V., Amsterdam (NL)

( * ) Notice: Subject to any disclaimer, the term of this patent is extended or adjusted under 35 U.S.C. 154(b) by 716 days.

(21) Appl. No.: 13/142,614

(22) PCT Filed: Dec. 30, 2009

(86) PCT No.: PCT/NL2009/000275
§ 371 (c)(1),
(2), (4) Date: Aug. 3, 2011

(87) PCT Pub. No.: WO2010/077133
PCT Pub. Date: Jul. 8, 2010

(65) Prior Publication Data
US 2011/0282020 A1    Nov. 17, 2011

Related U.S. Application Data

(60) Provisional application No. 61/141,515, filed on Dec. 30, 2008.

(30) Foreign Application Priority Data

Dec. 30, 2008    (NL) .................................... 2002382

(51) Int. Cl.
| | | |
|---|---|---|
| C08G 63/00 | (2006.01) | |
| C08G 63/85 | (2006.01) | |
| C08G 63/60 | (2006.01) | |
| C08G 63/668 | (2006.01) | |
| C08G 63/181 | (2006.01) | |
| C08G 63/672 | (2006.01) | |
| C08G 63/80 | (2006.01) | |
| C08F 4/72 | (2006.01) | |
| C08F 24/00 | (2006.01) | |

(52) U.S. Cl.
CPC ............ *C08G 63/85* (2013.01); *C08G 63/181* (2013.01); *C08G 63/60* (2013.01); *C08G 63/668* (2013.01); *C08G 63/672* (2013.01); *C08G 63/80* (2013.01)

(58) Field of Classification Search
CPC ... C08G 63/181; C08G 63/672; C08G 63/199; C08G 63/676; C08G 63/78; C08G 63/80; C08G 63/85; C08G 63/6856
USPC ....................................................... 528/307
See application file for complete search history.

(56) References Cited

U.S. PATENT DOCUMENTS

| 4,014,957 | A | 3/1977 | Kirsch et al. |
| 5,112,915 | A | 5/1992 | Morelli et al. |
| 5,958,581 | A | 9/1999 | Khanarian et al. |
| 6,737,481 | B1 | 5/2004 | Kurian et al. |
| 2009/0124763 | A1* | 5/2009 | Matsuda et al. ............. 525/437 |

FOREIGN PATENT DOCUMENTS

| EP | 0294863 A1 | 12/1988 |
| GB | 621971 | 4/1949 |
| GB | 1164374 | 9/1969 |
| GB | 1342489 | 1/1974 |
| JP | 2008-75068 A | 4/2008 |
| JP | 2008-291244 A | 12/2008 |
| WO | 2007-052847 A1 | 5/2007 |
| WO | 2009-104780 A1 | 8/2009 |

OTHER PUBLICATIONS

Garves, K., "Acid Catalyzed Degradation of Cellulose in Alcohols", Journal of Wood Chemistry and Technology, 8(1), pp. 121-134 (1988).
Busch, R., "Renewable Raw Materials for the Chemical Industry", NATO ASI, New Organic Chemistry Reactions and Methodologies for Green Productions, pp. 1-66 (Oct. 30-Nov. 5, 2006).
May 21, 2010 Communication to the IB/WIPO.
Moore et al., "Polyesters Derived from Furan and Tetrahydrofuran Nuclei", Marcomolecules, vol. 11, No. 3, pp. 568-573 (1978).
Machine Translation of JP 2008-75068 A.
Machine Translation of JP 2008-291244 A.
Hachihama, et al., "Syntheses of Polyesters Containing Furan Ring", Technol. Repts. Osaka Univ. 1958, 8, pp. 475-480.
Heertjes, et al., Polycondensation products of 2,5-furandicarboxylic acid, Delft Progress Reports, Series A, 1 (1974) pp. 59-63.

* cited by examiner

*Primary Examiner* — Ling Choi
*Assistant Examiner* — Gennadiy Mesh
(74) *Attorney, Agent, or Firm* — Hoffmann & Baron, LLP

(57) ABSTRACT

A process for preparing a polymer having a 2,5-furandicarboxylate moiety within the polymer backbone and having a number average molecular weight of at least 10,000 (as determined by GPC based on polystyrene standards) includes a first step where a prepolymer is made having the 2,5-furandicarboxylate moiety within the polymer backbone, followed in a second step by a polycondensation reaction. Polymers so produced may have a 2,5-furandicarboxylate moiety within the polymer backbone, and having a number average molecular weight of at least 20,000 (as determined by GPC based on styrene standards), and an absorbance as a 5 mg/mL solution in a dichloromethane: hexafluoroisopropanol 8:2 at 400 nm of below 0.05.

3 Claims, No Drawings

PROCESS FOR PREPARING A POLYMER HAVING A 2,5-FURANDICARBOXYLATE MOIETY WITHIN THE POLYMER BACKBONE AND SUCH (CO)POLYMERS

CROSS-REFERENCE TO RELATED APPLICATIONS

This application is the National Stage of International Application No. PCT/NL2009/000275, filed Dec. 30, 2009, which claims the benefit of Netherlands Application No. 2002382, filed Dec. 30, 2008 and U.S. Provisional Application No. 61/141,515, filed Dec. 30, 2008, the contents of all of which are incorporated by reference herein.

TECHNICAL FIELD

This invention relates to polymers and copolymers of 2,5-furandicarboxylic acid (abbreviated to 2,5-FDCA) and to a process for preparing such (co)polymers. In particular, this invention relates to polyesters and to a process of preparing them at high molecular weight without suffering from discoloration.

BACKGROUND ART

From a presentation that may be found on http://www.in-caweb.org/nato-asi_rsv/BUSCH_1.pdf by BUSCH, Rainer. Renewable Raw Materials for the Chemical Industry. NATO ASI "*New Organic Chemistry Reactions and Methodologies for Green Productions*". 30 Oct.-5 Nov. 2006, it is known to use 5-hydroxymethylfurane (5-HMF) as platform chemical for the preparation of 2,5-furandicarboxylic acid. With respect to the synthesis of this platform chemical, Dr. Busch mentions the production of 5-HMF from glucose or fructose (renewables) and suggests the oxidation of 5-HMF into 2,5-FDCA. However, at the same time, Dr. Busch mentions that there is still much development work required. Moreover, Dr. Busch suggests the preparation of segmented thermoplastics from renewables, having hard block(s) composed of the polyamide of 2,5-dicarboxylic acid and 1,6-hexanediamine, and having soft block(s) composed of the polyether of 1,4-butanediol. Dr. Busch, on the other hand has not prepared any of the polymers suggested in his presentation.

In GB 621971 polyesters (and polyester-amides) are prepared by reacting glycols with dicarboxylic acids of which at least one contains a heterocyclic ring, such as 2,5-FDCA. In place of the dicarboxylic acids, the dialkyl or diaryl esters thereof may be used, in particular where acids are used which tend to be unstable and to develop carbon dioxide under the conditions of the reaction. Moreover, when using di-esters, it is of advantage to include in the reaction mixture an ester-interchange catalyst, as for example an alkali metal, magnesium or tin. Indeed, in Examples 1 and 2 of this reference, dimethyl-2,5-furandicarboxylate is reacted with an excess of ethylene glycol in the presence of sodium dissolved in methanol and magnesium. A crystalline mass product is obtained, which is then at a temperature of 190 to 220° C. and under reduced pressure converted into a polymer.

In HACHIHAMA, Yoshikazu, et al. Syntheses of Polyesters containing Furan Ring. *Technol. Repts. Osaka Univ.* 1958, vol. 8, no. 333, p. 475-480. it is mentioned that many aromatic polyesters are known, but only polyethylene terephthalate is in commercial production. In this paper polyesters are produced by condensation of 2,5-FDCA with various $\alpha,\omega$-glycols. According to this paper, ester interchange has proved to be the most convenient method for 2,5-furandicarboxylic acid polyesters, since the acid is difficult to be purified. The ester interchange reaction is promoted by the presence of a catalyst such as litharge, a natural mineral form of lead(II) oxide. The polymers made, however, were brown to greyish white.

In WO 2007/052847 polymers are provided, having a 2,5-furandicarboxylate moiety within the polymer backbone and having a degree of polymerization of 185 or more and 600 or less. These polymers are made in a two step process involving the esterification of the 2,5-FDCA with a diol first, and a second step involving polycondensation through an ester exchange reaction. The first step is carried out catalytically at a temperature within the preferred range of 150 to 180° C., whereas the polycondensation step is carried out under vacuum at a temperature within the preferred range of 180 to 230° C. A particularly preferred example of a catalyst effective in both steps is titanium alkoxide. Indeed, in the examples 2,5-FDCA is reacted first with a diol, using a tin catalyst and a titanium catalyst. The intermediate product is then purified by dissolving the same in hexafluoroisopropanol, reprecipitation and drying, followed by solid state polymerization at a temperature in the range of from 140 to 180° C. Not disclosed, but found by the current inventors, is that the intermediate product produced by the process of this reference is darkly colored. This is therefore the reason for the purification step. This essential purification step, and in particular when using hexafluoroisopropanol, is a serious drawback of this process, severely limiting the commercialization thereof. The problem vis-à-vis this recent development is to produce polymers having a 2,5-furandicarboxylate moiety within the polymer backbone, at high molecular weight and without colored impurities, without having to use a purification step.

In MOORE, J. A., et al. Polyesters Derived from Furan and Tetrahydrofuran Nuclei. *Macromolecules*. 1978, vol. 11, no. 3, p. 568-573. are described. Polymers were prepared using 2,5-furandicarbonyl chloride as monomer. As a result, polymers in the form of a white precipitate having a very low intrinsic viscosity (and hence low molecular weight) were obtained. In addition, a polymer was prepared from 1,6-hexane diol and dimethyl-2,5-furan dicarboxylate, using calcium acetate and antimony oxide as catalyst. The number average molecular weight was low (less than 10,000), whereas the molecular weight distribution was relatively high (2.54 instead of about 2). Moreover, the product was greenish. Again, from this reference it would appear near impossible to produce polymers having a 2,5-furandicarboxylate moiety within the polymer backbone, at high molecular weight and without colored impurities, without having to use a precipitation and/or purification step.

In U.S. Pat. No. 4,014,957 thermoplastic moulding compositions of (A) 99.5 to 80% by weight, of at least one amorphous linear polyamide and (B) 0.5 to 20% by weight of at least one segmented thermoplastic elastomeric copolyester are disclosed. According to this patent segmented thermoplastic elastomeric copolyesters are known, which may be prepared from various dicarboxylic acids, including 3,4-FDCA.

In EP 0294863 A aromatic polyesters containing units with two carbonyl groups and having liquid crystalline properties are disclosed. The aromatic polyesters are characterized in that the polyesters contain heterocyclic units with two carbonyl groups. Preferably these units are derived from furandicarboxylic acid. The aromatic polyesters show a considerable reduction in melting temperature, rendering the polyester more processable. The heterocyclic unit acid can be a 2,5-FDCA, a 2,4-FDCA or a 2,3-FDCA or a derivative of these acids. The polyester according to this reference can be prepared in a process known per se, for example via condensation or esterification of the reactive derivatives of the components to be used. Preferably a condensation reaction is applied; the reaction of the monomers takes place between 50° C. and 350° C., preferably in an inert atmosphere such as nitrogen or argon, followed by a polycondensation reaction, at increased temperature and reduced pressure, which results in a polycondensate with the desired degree of polymerization. According to this reference it is possible to effect the condensation or esterification and the polycondensation reaction in the presence of a catalyst. Magnesium, manganese, sodium, potassium and/or zinc acetates are preferred.

In U.S. Pat. No. 5,112,915 copolyetherester molding compositions are described that comprise a copolyetherester and a modifying amount of a modulus reducing rubbery interpolymer comprising a crosslinked (meth)acrylate rubbery phase and an interpenetrating, crosslinked styrenic resin phase. According to the reference, suitable thermoplastic copolyetheresters (A) include both random and block copolymers. In general these are prepared by conventional esterification/polycondensation processes from (i) one or more diols, (ii) one or more dicarboxylic acids, (iii) one or more long chain ether glycols, and optionally, (iv) one or more lactones or polylactones. Dicarboxylic acids (ii) which are suitable for use in the preparation of the copolyetheresters include aliphatic, cycloaliphatic, and/or aromatic dicarboxylic acids. 3,4-FDCA is mentioned as a suitable acid to be used.

In U.S. Pat. No. 5,958,581 a polyester film made from a polymer having ethylene glycol moieties, isosorbide moieties and terepthaloyl moieties, and the method of making the film is described. The polyester of this reference may be formed by melt polymerization, which is carried out in two stages. First, the diols (e.g., ethylene glycol) are mixed with the dimethyl ester of the diacid (e.g., dimethyl terephthalate) in the presence of an ester interchange catalyst, which causes exchange of the ethylene glycol for the methyl group of the dimethyl esters through a transesterification reaction. The reaction is gradually heated to about 250° C. until methanol evolution stops. Preferred catalysts for ester interchange include $Mn(OAc)_2$, $Co(OAc)_2$, and $Zn(OAc)_2$, where OAc is the abbreviation for acetate, and combinations thereof. The second stage of the reaction is commenced by adding a polycondensation catalyst. An example of a polycondensation catalyst is antimony (III) oxide, which may be used at a level of 100 to about 400 ppm.

The polycondensation reaction is typically carried out at a temperature from about 250 to 285° C. The current inventors found that when using these conditions when producing polymers having a 2,5-furandicarboxylate moiety within the polymer backbone, it was impossible to obtain a polymer having a high molecular weight without suffering from an abundance of colored impurities.

In U.S. Pat. No. 6,737,481 a polymer comprising poly (alkylene-co-dianhydrosugar ester) dicarboxylate and its preparation is described. The processes of this reference avoid the problems created by the slow reaction rate for direct esterification or transesterification of isosorbide with terephthalic acid or dimethylterephthlate. Diacids that may be used in this process include 2,5-FDCA. The procedure, here described for isophthalic acid and isosorbide, involves heating a 0 to 100 mole % excess of isosorbide, with isophthalic acid in the presence of about 90-140 micrograms/g tin in the form of a suitable catalyst, such as n-butylstannoic acid under an inert gas atmosphere. The temperature is preferably from about 240 to about 260° C. and heating is continued until no further water evolves, typically for about 1 to 2 hours, indicating the end of the esterification reaction.

Catalysts that may be used in this process are generally known in the art, and include salts of U, Ca, Mg, Zr, Mn, Zn, Pb, Sb, Sn, and Ti, such as acetate salts and oxides, including glycol adducts, and Ti alkoxides and chelates.

The preferred molar ratio of catalyst to diacid is about 1:1,000 to about 1:7,300. A catalyst can also be used to enhance esterification or transesterification, and polycondensation catalysts are said to be particularly useful in transesterification.

From the above references, it would therefore appear that polymers and copolymers of 2,5-FDCA can be made by simply substituting terephthalic acid as diacid monomer and using 2,5-FDCA instead. However, the current inventors found that to be rather problematic.

In JP2008291244 a method for producing polyester resin including furan structure is provided. The method for producing a polyester resin including a furan structure comprises performing ester exchange reaction of a furan dicarboxylic dialkyl ester component with a diol component, and then performing polycondensation reaction in the presence of a titanium compound. A high-molecular-weight polyester resin can be produced using, as raw material, 2,5-furan dicarboxylic acid ester which is producible from a biomass raw material, and an industrially useful material excellent in heat resistance and mechanical physical properties can be thus provided. On the other hand, the molecular weight of the polyester resin leaves still much to desire, as does the polymerization time to achieve a reasonably high molecular weight.

Thus, the inventors found that polymers and copolymers having a 2,5-furandicarboxylate moiety within the polymer backbone, and polyesters in particular cannot be made at reasonably high molecular weight (number average molecular weight of at least 10.000) without suffering from byproducts that give rise to a yellow, greenish or brown color. On the other hand, the above references clearly show that there is a demand for polymers based on renewables to replace polyesters such as PET that are produced from petrochemicals. Thus, there is a need for a process for the production of polymers and copolymers having a 2,5-furandicarboxylate moiety within the polymer backbone which avoids the formation of such byproducts. This has now been achieved.

DISCLOSURE OF THE INVENTION

Technical Problem

The invention thus relates to a process for the production of polymers and copolymers having a 2,5-furandicarboxylate moiety within the polymer backbone, as claimed in claim 1. The (co)polymers so prepared have a number average molecular weight of at least 10,000 (as determined by GPC based on polystyrene standards), and an absorbance as a 5 mg/mL solution in a dichlomethane:hexafluoroisopropanol 8:2 mixture at 400 nm of below 0.05. The (co) polymers so prepared may be subjected to solid state polycondensation and then attain a number average molecular weight greater than 20,000 (as determined by GPC based on polystyrene standards) again without suffering from discoloration. These high molecular weight (co)polymers are novel. Thus, the invention also relates to novel polymers and copolymers.

Modes for Carrying Out the Invention

The process of the current invention is similar to the process for preparing poly(ethylene terephthalate) (PET) but has some characterizing distinctions. Thus, whereas PET is typically made with catalysts such as, manganese, cobalt and germanium, as mentioned above, we found that these catalysts result in a colored product.

Likewise, whereas bright-white PET can be made directly from a diol monomer and a diacid monomer, the current inventors found that the use of 2,5-FDCA inevitably results in a colored product. Moreover, whereas PET is typically made by polycondensation at polymerization temperatures of 250-280° C. and higher, again the inventors found that the polymers based on 2,5-FDCA made at such polymerization temperatures were colored product. Colored in this respect can be determined quantitatively by measuring the absorbance at 400 nm of a 5 mg/mL solution of the (co)polymer in dichlomethane:hexafluoroisopropanol 8:2 solvent mixture. If the absorbance is 0.05 or greater, then the product is deemed inferior.

Moreover, the current inventors found that the analogous process results in the formation of a byproduct with a lower MW, which therefore results in higher polydispersity index (PDI). This rather adversely affects the properties of the polymers so produced. These problems have been addressed, as discussed hereinafter.

Thus, the process of the current invention is a two-step process, wherein first a prepolymer is made having a 2,5-furandicarboxylate moiety within the polymer backbone. This intermediate product is preferably an ester composed of two diol monomers and one diacid monomer, wherein at least part of the diacid monomers comprises 2,5-FDCA, followed by a melt-polymerization of the prepolymers under suitable polymerization conditions. Such conditions typically involve reduced pressure to remove the equimolar excess of diol monomers.

For instance, within the scope of the current invention, in step (I) dimethyl-2,5-furandicarboxylate is reacted in a catalyzed transesterification process with about 2 equivalents of a diol, to generate the prepolymer whilst removing 2 equivalents of methanol. Dimethyl-2,5-furandicarboxylate is preferred, as this transesterification step generates methanol, a volatile alcohol that is easy to remove. However, as starting material diesters of 2,5-FDCA with other volatile alcohols or phenols (e.g., having a boiling point at atmospheric pressure of less than 150° C., preferably less than 100° C., more preferably of less than 80° C.) may be used as well. Preferred examples therefore include ethanol, methanol and a mixture of ethanol and methanol.

The aforementioned reaction leads to a polyester. Moreover, as discussed in more detail below, the diol monomers may contain additional hydroxyl groups, such as glycerol, pentaerythritol or sugar alcohols. Step (II) of the process of the current invention, is a catalyzed polycondensation step, wherein the prepolymer is polycondensed under reduced pressure, at an elevated temperature and in the presence of a suitable catalyst.

The inventors have found that it is essential that the first step is a transesterification step, catalyzed by a specific transesterification catalyst at a temperature preferably in the range of from about 150 to about 220° C., more preferably in the range of from about 180 to about 200° C. and carried out until the starting ester content is reduced until it reaches the range of about 3 mol % to about 1 mol %. The transesterification catalyst may be removed, to avoid interaction in the second step of polycondensation, but typically is included in the second step. The selection of the transesterification catalyst is therefore effected by the selection of the catalyst used in the polycondensation step.

Surprisingly, the inventors have found that tin(IV) based catalysts, preferably organotin(IV) based catalysts, more preferably alkyltin(IV) salts including monoalkyltin(IV) salts, dialkyl and trialkyltin(IV) salts and mixtures thereof, are good transesterification catalysts, that are better than tin(II) based catalysts such as tin(II) octoate. These tin(IV) based catalysts may be used with alternative or additional transesterification catalysts.

Examples of alternative or additional transesterification catalysts that may be used in step 1 include one or more of titanium(IV) alkoxides or titanium(IV) chelates, zirconium (IV) chelates, or zirconium(IV) salts (e.g. alkoxides); hafnium(IV) chelates or hafnium(IV) salts (e.g. alkoxides).

Although these alternative or additional catalysts may be suitable for the transesterification, they may actually interfere during the polycondensation step. Therefore, in the preferred embodiment of the current invention, the main or sole transesterification catalyst is a tin(IV) based catalyst.

Preferred transesterification catalysts are selected from one or more of, butyltin(IV) tris(octoate), dibutyltin(IV) di(octoate), dibutyltin(IV) diacetate, dibutyltin(IV) laureate, bis(dibutylchlorotin(IV)) oxide, dibutyltin dichloride, tributyltin(IV) benzoate and dibutyltin oxide.

In respect to the catalyst, it should be realized that the active catalyst as present during the reaction may be different from the catalyst as added to the reaction mixture.

The catalysts are used in an amount of about 0.01 mol % relative to initial diester to about 0.2 mol % relative to initial diester, more preferably in an amount of about 0.04 mol % of initial diester to about 0.16 mol % of initial diester.

The intermediate product (i.e., the prepolymer) may, but importantly need not be isolated and/or purified. Preferably, the product is used as such in the subsequent polycondensation step. In this catalyzed polycondensation step, the prepolymer is polycondensed under reduced pressure, at an elevated temperature and in the presence of a suitable catalyst. The temperature is preferably in the range of about the melting point of the polymer to about 30° C. above this melting point, but preferably not less than about 180° C. The pressure should be reduced preferably gradually. It should preferably be reduced to as low as possible, more preferably below 1 mbar.

Again, the inventors have found that it is essential that this second step is catalyzed by a specific polycondensation catalyst and that the reaction is carried out at mild melt conditions.

Examples of suitable polycondensation catalysts include tin(II) salts such as tin(II) oxide, tin(II) dioctoate, butyltin (II) octoate, or tin(II) oxalate. Preferred catalysts are tin(II) salts obtained by the reduction of the tin(IV) catalyst, e.g. alkyltin(IV), dialkyltin(IV), or trialkyltin(IV) salts, used as transesterification catalyst with a reducing compound. Reducing compounds used may be well-known reducing compounds, preferably phosphorus compounds. Particularly preferred reducing compounds are organophosphorus compounds of trivalent phosphorus, in particular a monoalkyl or dialkyl phosphinate, a phosphonite or a phosphite. Examples of suitable phosphorus compounds are triphenyl phosphite, diphenyl alkyl phosphite, phenyl dialkyl phosphite, tris (nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, di(2,4-di-tert-butylphenyl)pentaerythritol diphosphite, tristearylsorbitol triphosphite, tetrakis(2,4-di-tert-butylphenyl) 4,4'-diphenylenediphosphonite, 4,4'-isopropylidenediphenol alkyl (C12-15) phosphite, poly(dipropylene glycol) phenyl phosphite, tetraphenyl dipropylene glycol phosphite, tetraphenyl diisopropylene glycol phosphite, trisisodecyl phosphite, diisodecyl-phenyl phosphite, diphenyl isodecyl phosphite, and mixtures of these.

The preferred catalysts therefore include tin(II) salts such as tin(II) dioctoate, butyl(II) octoate and other alkyltin(II) octoate compounds, prepared from the corresponding tin (IV) salt using e.g., a trialkyl phosphite, a monoalkyl diaryl phosphite, a dialkyl monoaryl phosphite or a triaryl phosphite. Preferably, the reducing compound is added in the melt of the prepolymer. Rather surprisingly, the inventors have found that the addition of the reducing compound at this stage avoids discoloration.

In other words, a combination of transesterification catalyst and polycondensation catalyst that is of particular interest, is based on a tin(IV) type catalyst during transesterification, which is reduced, preferably with triphenylphosphite and/or tris(nonylphenyl)phosphite, to a tin(II) type catalyst during the polycondensation.

The catalysts are used in an amount of about 0.01 mol % relative to initial diester to about 0.2 mol % relative to initial diester, more preferably in an amount of about 0.04 mol % of initial diester, to about 0.16 mol % of initial diester.

Of particular interest is that the combination of tin(IV) type catalyst and tin(II) type catalyst retains activity. This allows for the same catalyst to be used for a subsequent solid state polycondensation. The solid state polycondensation (SSP) is a common process used in the preparation of PET. In SSP processes pellets, granules, chips or flakes of polymer are subjected for a certain amount of time to elevated temperatures (below melting point) in a hopper, a tumbling drier or a vertical tube reactor or the like.

The inventors found that with Sn(IV)/Sn(II) catalyst system higher molecular weight can be reached than with titanium catalysts. Surprisingly, tin type catalysts allowed SSP of the FDCA-based polymers to reach a number average molecular weight of 20,000 and greater. These high molecular weight FDCA-based polymers are considered to be new.

Conditions and equipment for SSP are known, in particular as SSP is frequently used to upgrade recycled PET. The only important adaption is that the temperature should be elevated, but nonetheless remain (well) below the melting point of the polymer.

Polyesters and various copolymers (random or block) may be made according to the process of the current invention, depending on the selection of the monomers used. For instance, linear polyesters may be made with 2,5-FDCA (in the form of its methyl ester) and an aromatic, aliphatic or cylcoaliphatic diol. The 2,5-FDCA ester may be used in combination with one or more other dicarboxylic acid esters or lactones. Likewise, the diol may be a combination of two or more diols. Polyesters that have never been produced before and that are claimed in this application are those having both a 2,5-furandicarboxylate moiety within the polymer backbone, as well as a 1,4-bis(hydroxymethyl)cyclohexane (either of the stereoisomers or a mixture thereof) or 2,2-dimethyl-1,3-propanediol or poly(ethylene glycol) or poly(tetrahydrofuran) or glycerol or pentaerythritol or lactic acid (derived from L or D lactide or a mixture thereof) or 6-hydroxyhexanoic acid (e.g., derived from ϵ-caprolactone) within the polymer backbone.

The polymers and copolymers according to the current invention need not be linear. If a polyfunctional aromatic, aliphatic or cycloaliphatic alcohol is used, or part of the diol is replaced by such a polyol, then a branched or even crosslinked polymer may be obtained. A branched or crosslinked polymer may also be obtained when part of the 2,5-FDCA ester is replaced by an ester of a polyacid.

Examples of suitable diol and polyol monomers therefore include ethylene glycol, diethylene glycol, 1,2-propanediol, 1,3-propanediol, 1,4-butanediol, 1,5-pentanediol, 1,6-hexanediol, 1,4-cyclohexanedimethanol, 1,4-benzenedimethanol, 2,2-dimethyl-1,3-propanediol, poly(ethylene glycol), poly(tetrahydrofuran), 2,5-di(hydroxymethyl)tetrahydrofuran, isosorbide, glycerol, pentaerythritol, sorbitol, mannitol, erythritol, threitol.

Preferred examples of diols and polyols are ethylene glycol, 1,3-propanediol, 1,4-butanediol, 1,4-cyclohexanedimethanol, 1,6-hexanediol, 2,2-dimethyl-1,3-propanediol, poly(ethylene glycol), poly(tetrahydrofuran), glycerol, pentaerythritol.

Suitable dicarboxylic acid esters or polycarboxylic acid esters to be used in combination with the 2,5-furandicarboxylate ester therefore include dimethyl terephthalate, dimethyl isophthalate, dimethyl adipate, dimethyl azelate, dimethyl sebacate, dimethyl dodecanoate, dimethyl 1,4-cyclohexane dicarboxylate, dimethyl maleate, dimethyl succinate, trimethyl 1,3,5-benzenetricarboxylate.

Preferred examples of dicarboxylic acid esters or polycarboxylic acid esters to be used in combination with the 2,5-furandicarboxylate ester are dimethyl terephthalate, dimethyl adipate, dimethyl maleate, dimethyl succinate, trimethyl-1,3,5-benzenetricarboxylate. More preferably, these may be present in a molar ratio of about 10:1 to about 1:10 vis-à-vis the 2,5-furandicarboxylate ester. This mixture of reactants is referred to as the acid ester reactant.

Preferred examples of lactones to be used in combination with the 2,5-furandicarboxylate ester are pivalolactone, ϵ-caprolactone and lactides (L,L; D,D; D,L).

The polymers of the current invention are of value in all forms of application where currently PET and similar polyesters are used. For instance, they may be used in fibres, films and packaging materials.

The polymers of the current invention may be used as such or in blends and compounds. They may contain other components such as plasticizers, softeners, dyes, pigments, antioxidants, stabilizers, fillers and the like.

The following examples illustrate the current invention.

EXAMPLES

Materials 2,5-Furandicarboxylic acid (FDCA) was purchased from Exclusive Chemistry Ltd. Diols, solvents and catalysts were supplied by Aldrich and used as received.

Preparation of dimethyl-2,5-furandicarboxylate (DMF)

In a 500 mL round-bottom flask, 23.4 g (0.15 mol) 2,5-FDCA was mixed with 250 mL methanol and 6 mL cc. sulfuric acid. The slurry was refluxed for 5 hours, while all of the FDCA dissolved. After 5 hours reflux, 150 mL methanol was distilled off (bath temperature was not higher than 85° C.) and the solution cooled down to room temperature in a beaker. 80 mL 20% Na$_2$CO$_3$ solution was slowly added and the slurry was filtered and washed in a Buchner funnel. The crude product was dissolved in 150 mL dichloromethane and dried over Na$_2$SO$_4$. After 1 hour, the solution was passed through a 10 cm high Al$_2$O$_3$ (neutral) column and then the solvent was evaporated in a rotary evaporator. Yield: 22.27 g (80.4%), m.p. 112.3° C.

Analytical Techniques

GPC measurements were performed on a Merck-Hitachi LaChrom HPLC system equipped with two PLgel 10 μm MIXED-C (300×7.5 mm) columns. Chloroform:2-chlorophenol 7:3 solvent mixture was used as eluent. Calculation of the molecular weight was based on polystyrene standards and carried out by Cirrus™ PL DataStream software. UV-visible spectra and absorbances were recorded on a Heliosα (ThermoSpectronic) spectrophotometer.

Polymerizations

Polycondensation reactions in examples 1-5 were carried out in a high-throughput film reactor. It consisted of a cylindrical aluminum block (9 cm height, 17 cm diameter) in which 25 vials (5 cm height, 16 mm diameter) could be placed. The upper part hosted the in- and outlet tubes. Another aluminum block connected to the temperature controller heated the reactor. The accuracy of temperature control was ±5° C. around the set point due to big inertia of the system. The pressure was measured by an APGX Active Linear Pirani Gauge. Similar experiments were carried out in a gram scale reactor (Example 6).

Example 1

Comparison of FDCA and DMF as Monomers

Preparation of Prepolymer from FDCA

In a 50 mL two-necked flask fitted with reflux condenser and N$_2$ inlet, 2.34 g (15 mmol) FDCA and 2.79 g (45 mmol) ethylene glycol were placed. To this mixture, 6.0 mmol titanium(IV) isopropoxide was added in 75 μL toluene stock solution. The introduction of N$_2$ was started and then the flask was placed in a silicon oil bath. Under stirring of the melt with magnetic stir bar, the temperature was raised from 150° C. to 200° C. within 1 hour. Then the temperature was kept between 200-210° C. for 4 hours.

Polycondensation 184 mg (1 mmol) DMF, 186 mg (3 mmol) ethylene glycol and 0.4 μmol titanium(IV) isopropoxide were placed into a vial. This mixture was heated in the film reactor at 190±5° C. for 3 hours under stirring. Into another vial, 216 mg precondensate of FDCA was placed. Both vials were then put in the film reactor at 240° C. and the vacuum applied. Polycondensation was carried out for 3 hours (Table 1), resulting in the preparation of poly(ethylene furandicarboxylate) (PEF).

TABLE 1

Characteristics of PEF made from FDCA and DMF

| Monomer | A (400 nm)* | $M_n$ | $M_w$ | PDI |
|---|---|---|---|---|
| FDCA | 0.228 | 12500 | 32500 | 2.60 |
| DMF | 0.042 | 11050 | 29070 | 2.63 |

*c = 5 mg/mL in dichloromethane:hexafluoroisopropanol 8:2.

Example 2

Effect of Temperature on Coloration 184 mg (1 mmol) DMF, 153.6 mg (1.3 mmol) 1,6-hexanediol and 0.8 μmol titanium(IV) isopropoxide were placed into three vials. They were heated at 200° C. in the film reactor for 3 hours at atmospheric pressure. Then the polycondensation was carried out at 200° C. or 240° C. or 275° C. for 3 hours.

TABLE 2

Absorbancies and yields of poly(hexamethylene 2,5-furandicarboxylate) samples prepared at different temperatures.

| Polycondensation temperature | Yield (%)* | A (400 nm)** |
|---|---|---|
| 200° C. | 97.8 | 0.008 |
| 240° C. | 97.7 | 0.021 |
| 275° C. | 93.8 | 0.074 |

*100% Yield is the theoretical amount of polymer obtained with infinitely high $M_n$.
**c = 5 mg/mL in dichloromethane:hexafluoroisopropanol 8:2.

Example 3

Effect of Catalyst on Coloration

The following reaction mixture was prepared.

184 mg (1 mmol) DMF, 186 mg (3 mmol) ethylene glycol and 10 μmol sodium methoxide (similar to the method described in GB 621971).

This mixture was heated at 190±5° C. first in the film reactor for 3 hours at atmospheric pressure. Then the polycondensation was carried out at 240±5° C. under vacuum (<1 mbar) for 3 hours.

TABLE 3

| Catalyst (μmol) | Yield (%)* | A (400 nm)** | $M_n$ | $M_w$ | PDI |
|---|---|---|---|---|---|
| NaOCH$_3$ (10) | 72.6 | 0.214 | 5450 | 13600 | 2.50 |

*100% Yield is the theoretical amount of polymer obtained with infinitely high $M_n$.
**c = 5 mg/mL in dichloromethane:hexafluoroisopropanol 8:2.

Example 4

Comparison of titanium(IV) isopropoxide and butyltin(IV) tris(octoate)-tris(nonylphenyl)phosphite catalyst system in PEF synthesis The following reaction mixture was prepared. 184 mg (1 mmol) DMF and 186 mg (3 mmol) ethylene glycol were mixed and titanium(IV) isopropoxide or butyltin(IV) tris (octoate) solution in toluene was added. The amount of catalyst is indicated in the tables. Transesterification was carried out at 190° C. for 2 hours in the case of 0.4 μmol and 0.8 μmol catalyst amounts and for 80 minutes in the case of 1.6 μmol catalyst amount. Tris(nonylphenyl)phosphite was applied in toluene solution after transesterification and the melt was stirred with the tris(nonylphenyl)phosphite for 5 minutes. The polycondensation was performed at 235±5° C. under vacuum (<1 mbar).

TABLE 4

Characteristics of PEF prepared with titanium(IV) isopropoxide

| n(catalyst) | Time of polycond. | A(400 nm) | $M_n$ | $M_w$ | PDI |
|---|---|---|---|---|---|
| 0.4 μmol | 1 hour | 0.012 | 8830 | 18380 | 2.08 |
| 0.4 μmol | 2 hours | 0.017 | 10630 | 23170 | 2.18 |
| 0.4 μmol | 3 hours | 0.026 | 12580 | 28460 | 2.26 |

TABLE 4-continued

Characteristics of PEF prepared with titanium(IV) isopropoxide

| n(catalyst) | Time of polycond. | A(400 nm) | $M_n$ | $M_w$ | PDI |
|---|---|---|---|---|---|
| 0.4 μmol | 5 hours | 0.042 | 14450 | 35250 | 2.44 |
| 0.8 μmol | 1 hour | 0.009 | 8870 | 19050 | 2.15 |
| 0.8 μmol | 2 hours | 0.016 | 10500 | 24830 | 2.36 |
| 0.8 μmol | 3 hours | 0.025 | 10500 | 24830 | 2.15 |
| 0.8 μmol | 5 hours | 0.035 | 12300 | 31140 | 2.53 |
| 1.6 μmol | 1 hour | 0.011 | 8700 | 23700 | 2.73 |
| 1.6 μmol | 2 hours | 0.017 | 9670 | 29400 | 3.04 |
| 1.6 μmol | 3 hours | 0.027 | 12960 | 39000 | 3.01 |
| 1.6 μmol | 5 hours | 0.040 | 13940 | 45750 | 3.28 |

The molecular weight of PEF does not increase over a titanium(IV) isopropoxide concentration of 0.04 mol % (Table 4), however, $M_n$ does increase when the catalyst is butyltin(IV) tris(octoate) (Table 5). The presence of organic phosphite suppresses discoloration.

TABLE 5

Characteristics of PEF prepared with butyltin(IV) tris(octoate) - tris(nonylphenyl)phosphite system

| n (catalyst) | n (TNPP*) | Time of polycond. | A (400 nm) | $M_n$ | $M_w$ | PDI |
|---|---|---|---|---|---|---|
| 0.4 μmol | 0.8 μmol | 1 hour | 0.032 | 7490 | 14700 | 1.96 |
| 0.4 μmol | 0.8 μmol | 2 hours | 0.035 | 8860 | 17750 | 2.00 |
| 0.4 μmol | 0.8 μmol | 3 hours | 0.075 | 10090 | 22200 | 2.20 |
| 0.4 μmol | 0.8 μmol | 5 hours | 0.049 | 12750 | 31100 | 2.44 |
| 0.8 μmol | 1.6 μmol | 1 hour | 0.033 | 8400 | 16350 | 1.95 |
| 0.8 μmol | 1.6 μmol | 2 hours | 0.043 | 9470 | 19950 | 2.11 |
| 0.8 μmol | 1.6 μmol | 3 hours | 0.047 | 10710 | 23200 | 2.17 |
| 0.8 μmol | 1.6 μmol | 5 hours | 0.049 | 13075 | 31060 | 2.38 |
| 1.6 μmol | 3.2 μmol | 1 hour | 0.038 | 10240 | 23550 | 2.30 |
| 1.6 μmol | 3.2 μmol | 2 hours | 0.049 | 12460 | 30930 | 2.48 |
| 1.6 μmol | 3.2 μmol | 3 hours | 0.050 | 15450 | 40840 | 2.64 |
| 1.6 μmol | 3.2 μmol | 5 hours | 0.059 | 18890 | 56800 | 3.00 |
| 1.6 μmol | — | 1 hour | 0.055 | 9600 | 21870 | 2.28 |
| 1.6 μmol | — | 2 hours | 0.080 | 10200 | 27300 | 2.67 |
| 1.6 μmol | — | 3 hours | 0.118 | 14220 | 39380 | 2.77 |
| 1.6 μmol | — | 5 hours | 0.110 | 17020 | 48230 | 2.83 |

*Tris(nonylphenyl)phosphite

Example 5

Comparison of Sn(II) and Sn(IV) Catalysts in PEF Synthesis

The following reaction mixture was prepared. 184 mg (1 mmol) DMF and 186 mg (3 mmol) ethylene glycol were mixed and butyltin(IV) tris(octoate) or tin(II) (2-octoate) solution in toluene was added. The amount of catalyst is indicated in the tables. Transesterification was carried out at 190° C. for 80 minutes. The polycondensation was performed at 235±5° C. under vacuum (<1 mbar).

TABLE 6

Characteristics of PEF prepared with Sn(IV) or Sn(II) catalyst.

| Catalyst | n (catalyst) | Time of polycond. | A (400 nm) | $M_n$ | $M_w$ | PDI |
|---|---|---|---|---|---|---|
| Sn(IV) | 1.6 μmol | 1 hour | 0.055 | 9600 | 21870 | 2.28 |
| | 1.6 μmol | 2 hours | 0.080 | 10200 | 27300 | 2.67 |
| | 1.6 μmol | 3 hours | 0.118 | 14220 | 39380 | 2.77 |
| | 1.6 μmol | 5 hours | 0.110 | 17020 | 48230 | 2.83 |
| Sn(II) | 1.6 μmol | 1 hour | 0.288 | 4870 | 8500 | 1.75 |
| | 1.6 μmol | 2 hours | 0.479 | 6040 | 11370 | 1.88 |
| | 1.6 μmol | 3 hours | 0.492 | 6600 | 13830 | 2.09 |

Sn(II) is very slow catalyst in the transesterification step, thus discoloration is intense and the molecular weight is much lower than with Sn(IV). As already shown in Table 5, the best results are obtained in the presence of a phosphite.

Example 6

Comparison of titanium(IV) isopropoxide and butyltin(IV) tris(octoate)-tris(nonylphenyl)phosphite catalyst system in PEF synthesis in gram scale experiments The following reaction mixture was prepared. 50 mmol DMF and 125 mmol ethylene glycol were mixed and titanium(IV) isopropoxide (20 μmol) or butyltin(IV) tris (octoate) (80 μmol) in toluene solution was added. Transesterification was carried out at 190° C. for 2 hours under constant nitrogen flow. In the case of butyltin(IV) tris (octoate), after 2 hours tris(nonylphenyl)phosphite was added and the melt was stirred for another 5 minutes. The polycondensation was performed at 235±5° C. under vacuum (<1 mbar).

TABLE 7

Characteristics of PEF prepared with titanium(IV) isopropoxide (0.04 mol %)

| Polymerization time (hour) | A (400 nm) | $M_n$ | $M_w$ | PDI |
|---|---|---|---|---|
| 1.0 | <0.005 | 5640 | 9520 | 1.68 |
| 1.5 | <0.005 | 6490 | 11430 | 1.76 |
| 2.0 | <0.005 | 7540 | 13620 | 1.81 |
| 2.5 | <0.005 | 8300 | 15250 | 1.84 |
| 3.0 | <0.005 | 9010 | 16800 | 1.86 |
| +1.0 at 250° C. | 0.008 | 10500 | 20400 | 1.94 |

TABLE 8

Characteristics of PEF prepared with butyltin(IV) tris(octoate) (0.16 mol %) and Tris(nonylphenyl)phosphite (0.2 mol %)

| Polymerization time (hour) | A (400 nm) | $M_n$ | $M_w$ | PDI |
|---|---|---|---|---|
| 1.0 | 0.013 | 6910 | 13320 | 1.93 |
| 2.0 | 0.021 | 10100 | 20960 | 2.08 |
| 3.0 | 0.024 | 11800 | 26300 | 2.23 |
| 4.0 | 0.023 | 13500 | 30400 | 2.25 |
| 5.0 | 0.025 | 15200 | 34540 | 2.28 |

Example 7

Solid State Polymerization of PEF Prepared with butyltin(IV) tris(octoate) (0.16 mol %)-tris(nonylphenyl)phosphite (0.2 mol %) system Solid state polymerization experiments were performed in a tube reactor, which was heated in a tube oven. The length of the tube reactor was 60 cm with a diameter of 0.8 cm. The reactor was charged with 14.0 gram of PEF with $M_n$=15300 and $M_w/M_n$=2.70. Then it was transferred into the tube oven and nitrogen gas flow was started with a flow rate of 30 mL/min. The oven temperature was set to 230° C., which meant in the reactor 198.2° C. at the back and 201° C. at the front. After 60 hours heating, the reactor was cooled down to room temperature and samples were taken for GPC analysis. It showed that the polymer at the front of the reactor had a $M_n=34000$ and $M_w/M_n=1.99$, and polymers at the back of reactor have a $M_n=24760$, and $M_w/M_n=2.07$.

The invention claimed is:

1. A polymer having a 2,5-furandicarboxylate moiety within the polymer backbone, and having a number average molecular weight of at least 20,000 (as determined by GPC based on styrene standards), and an absorbance as a 5 mg/mL solution in a dichloromethane:hexafluoroisopropanol 8:2 at 400 nm of below 0.05, the polymer being poly(ethylene 2,5-furan-dicarboxylate).

2. The polymer according to claim 1, having a number average molecular weight of at least 20,000, as determined by GPC using an HPLC system and a chloroform/2-chlorophenol mixture as eluent.

3. The polymer according to claim 2, wherein the GPC measurements were performed on a Merck-Hitachi LaChrom HPLC system equipped with two PLgel 10 μm MIXED-C(300*7.5 mm) columns wherein a chloroform:2-chlorophenol 7:3 solvent mixture was used as eluent.

* * * * *